Figure 10:
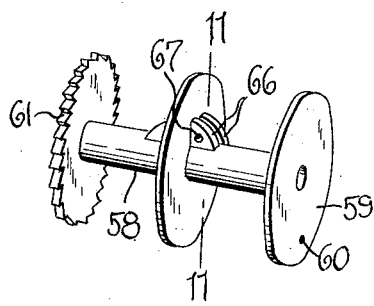

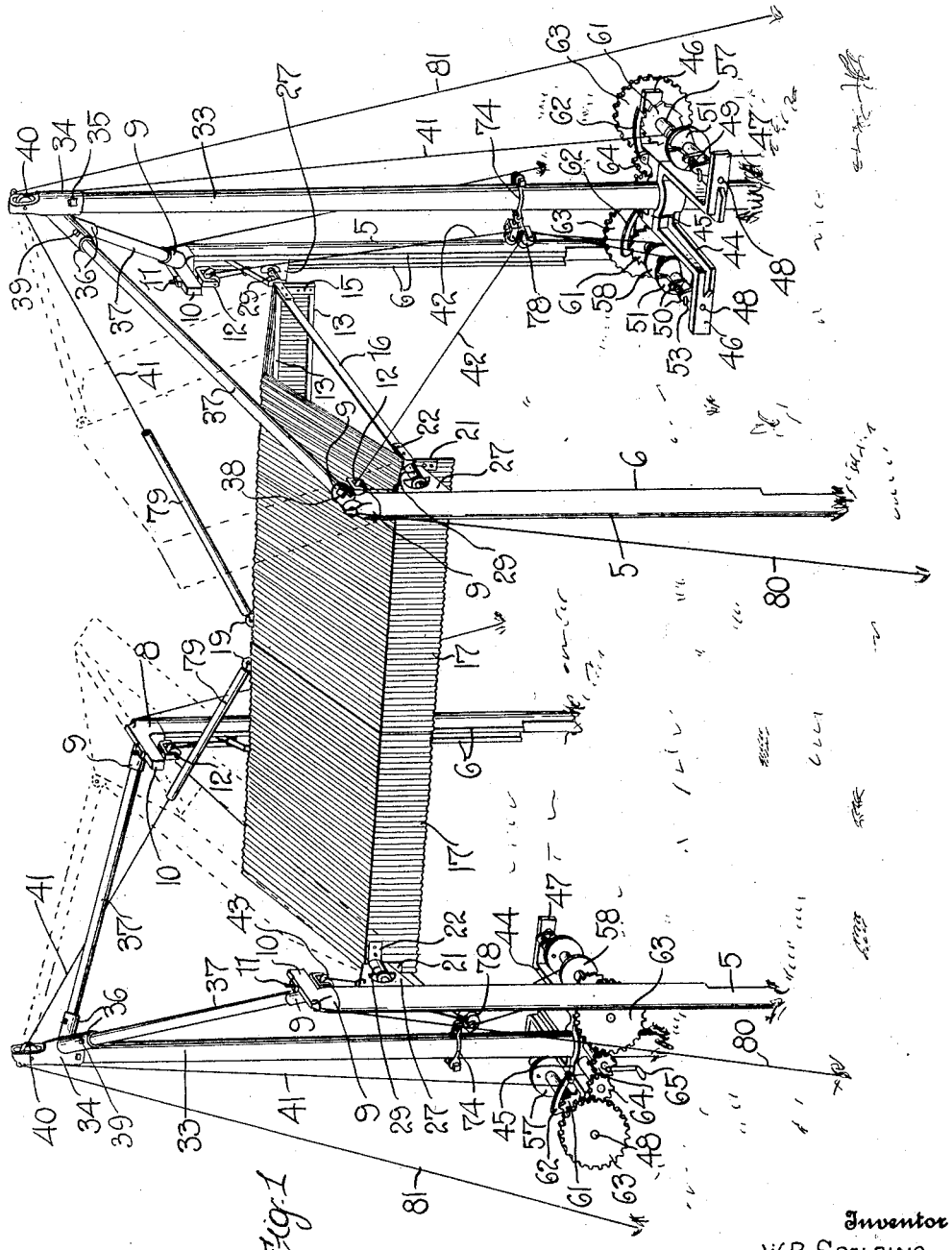

W. B. SPALDING.
STACK COVER.
APPLICATION FILED JUNE 4, 1914.
1,114,057.
Patented Oct. 20, 1914.
4 SHEETS—SHEET 2.
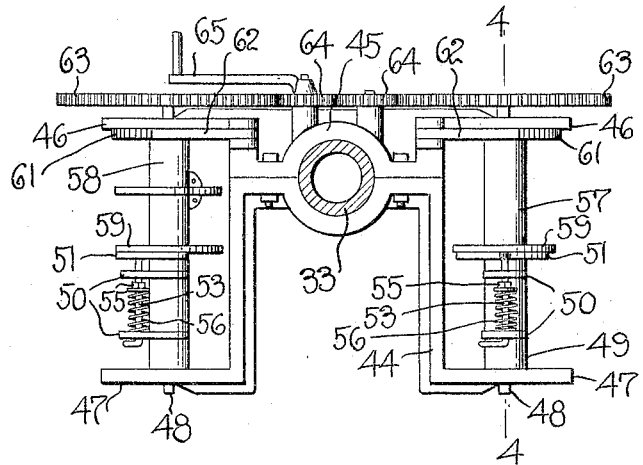
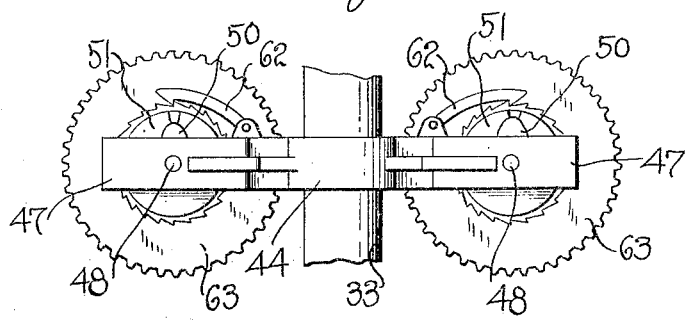
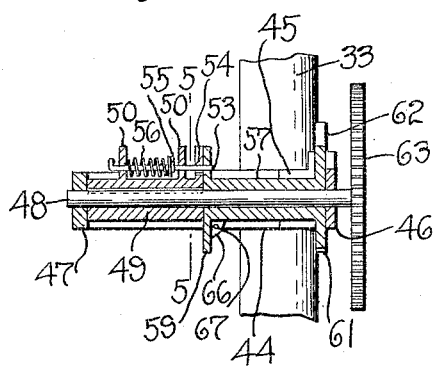
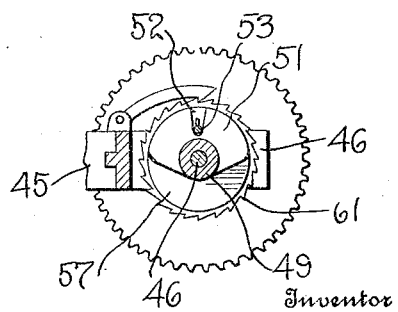
Witnesses
Robert M. Sutphen
A. I. Hind
Inventor
W. B. Spalding
By Watson E. Coleman
Attorney
THE NORRIS PETERS CO., PHOTO-LITHO., WASHINGTON, D. C.

W. B. SPALDING.
STACK COVER.
APPLICATION FILED JUNE 4, 1914.
1,114,057.
Patented Oct. 20, 1914.
4 SHEETS—SHEET 3.
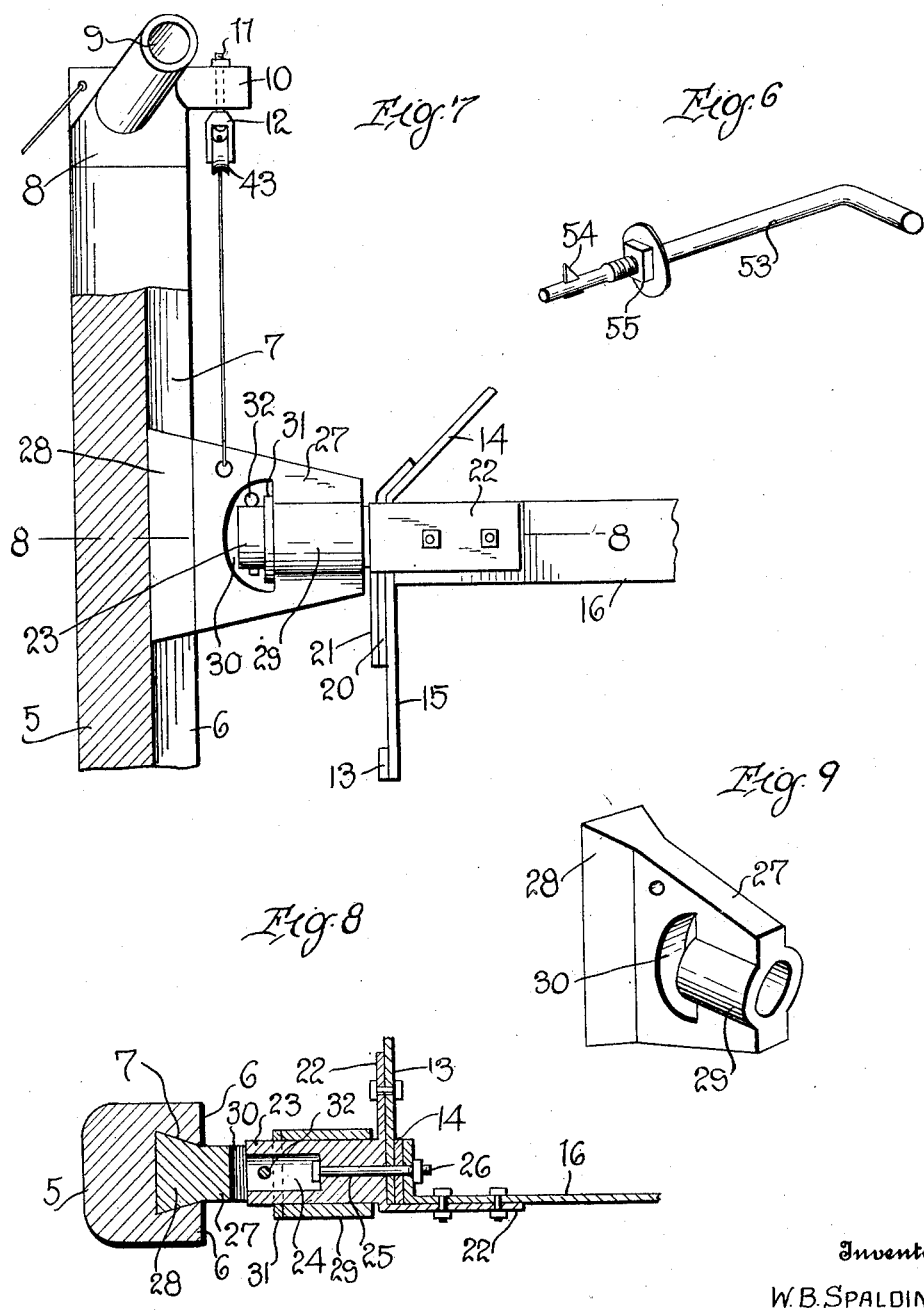
Witnesses
Robert M. Sutphen
A. J. Hind
Inventor
W. B. SPALDING
By Watson E. Coleman
Attorney

W. B. SPALDING.
STACK COVER.
APPLICATION FILED JUNE 4, 1914.

1,114,057.

Patented Oct. 20, 1914.

4 SHEETS—SHEET 4.

Inventor
W. B. SPALDING

Witnesses
Robert M. Sutphen
A. L. Hind

By Watson E. Coleman
Attorney

UNITED STATES PATENT OFFICE.

WILBER BRADEN SPALDING, OF WAMEGO, KANSAS.

STACK-COVER.

1,114,057.  Specification of Letters Patent.  Patented Oct. 20, 1914.

Application filed June 4, 1914. Serial No. 843,021.

*To all whom it may concern:*

Be it known that I, WILBER BRADEN SPALDING, citizen of the United States, residing at Wamego, in the county of Wabaunsee and State of Kansas, have invented certain new and useful Improvements in Stack-Covers, of which the following is a specification, reference being had to the accompanying drawings.

This invention relates to an improved hay stack cover and has for its primary object to provide improved means for mounting the cover whereby the same may be easily and quickly adjusted and positioned over the hay stack.

The invention has for another object to provide a hay stack cover consisting of two sections, each mounted at one of its ends between vertically disposed guides, means for simultaneously raising and lowering the cover sections, and additional means connected to the other end of each section whereby the same may be pivotally moved between its guides and disposed in an open position, to permit of access to the hay stack.

The invention has for a further object to provide very simple and novel means whereby the pivotal movement of the stack cover sections is limited so that the same will return to their normal closed positions over the stack by gravity.

The invention has for still another object to provide an improved winch mechanism including a double drum and cables connecting said drums to the pivotally mounted end of the cover section, and means for easily and quickly locking said drum upon the drum shaft or releasing the same therefrom.

It is another object of the invention to generally improve and simplify the construction of apparatus of the above character, increase its efficiency and reliability in actual use and provide means whereby the sectional stack cover may be easily and quickly arranged in position over the stack with comparatively little manual labor.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 11:
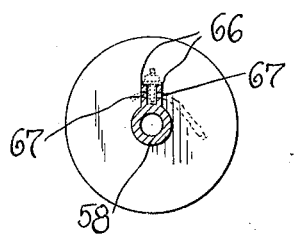
Figure 12:
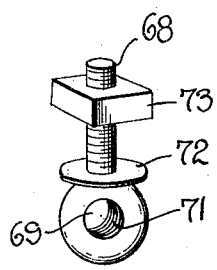
Figure 13:
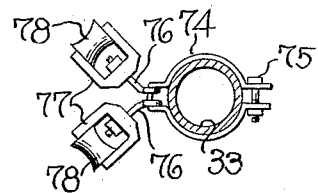
Figure 14:
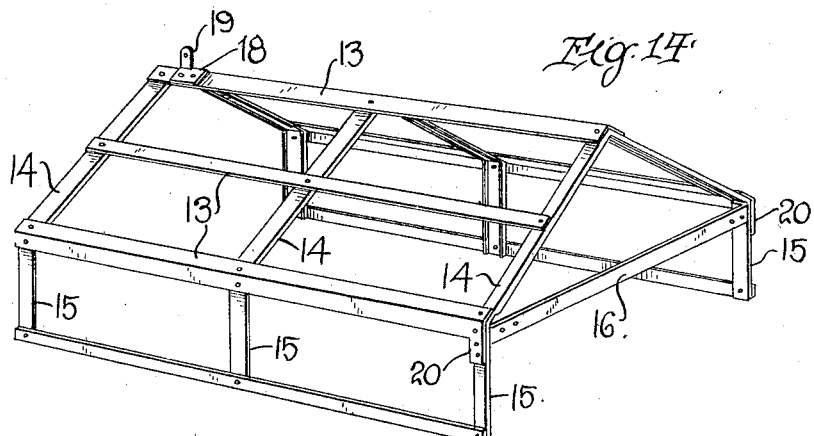

Figure 1 is a perspective view illustrating the preferred construction of my invention; Fig. 2 is an enlarged top plan view of one of the winch mechanisms; Fig. 3 is an end elevation thereof; Fig. 4 is a section taken on the line 4—4 of Fig. 2; Fig. 5 is a section taken on the line 5—5 of Fig. 4; Fig. 6 is a detail perspective view of the locking bolt for the drum; Fig. 7 is an enlarged vertical section of the upper end of one of the guide posts illustrating the manner of mounting the cover section thereon; Fig. 8 is a section taken on the line 8—8 of Fig. 7; Fig. 9 is a detail perspective view of one of the slide blocks; Fig. 10 is a detail perspective view of the double drum; Fig. 11 is a section taken on the line 11—11 of Fig. 10; Fig. 12 is a detail perspective view of the cable attaching bolt; Fig. 13 is a detail plan view illustrating the means for securing the guide sheaves to the mast or standard; Fig. 14 is a perspective view of the skeleton frame of one of the cover sections.

Referring in detail to the drawings, 5 designates the corner posts, each of which is provided upon its inner side with spaced flanges 6 having outwardly converging opposed walls to form dovetail grooves or guide ways 7. These posts are suitably anchored at their lower ends in the ground and upon the upper end of each post a metal cap member 8 is secured. This cap member is formed with a socket 9 and a laterally projecting arm 10. A bolt 11 is secured in this arm and upon said bolt a sheave block 12 is swiveled.

Each of the stack cover sections includes a suitable skeleton frame, which is best illustrated in Fig. 14, said frame consisting of a plurality of longitudinal bars 13 and transverse connecting bars 14 which are riveted or otherwise securely fixed to said longitudinal bars. The transverse bars 14 have obliquely inclined portions extending in opposite directions from the apex of the frame, and from the lower ends of said oblique portions of the frame bars, the same are vertically extended, as shown at 15, the end bars 14 of the frame being connected and braced at the juncture of the inclined vertical portions thereof by the transverse bars 16. This skeleton frame is covered by galvanized sheet iron plates indicated at 17 which are preferably corrugated as shown. To one end of the longitudinal bar 13 at the apex of the cover frame, a plate 18 is secured having an upwardly projecting perforated lug 19 formed upon one end. The frame bars 13 at the outer edges of the obliquely inclined walls of the cover section are provided at one of their ends with the downwardly projecting extensions 20. Brackets are secured to this end of the cover section, each of said brackets having a central arm 21 and additional arms 22 extending at right angles to each other from one end of said central arm. The arm 21 is adapted to be secured to the extension 20 of the frame bar while the arms 22 are secured to the bar 13 and the transverse brace bars 16 respectively. Upon each of the brackets at the juncture of the arms 21 and 22 thereof, a pivot stud 23 is formed. The outer end portion of this stud is tubular as indicated at 24 while the inner solid portion thereof is centrally bored as shown at 25. Through this longitudinal bore or opening in the stud, a bolt 26 is adapted to be inserted, said bolt also extending through the cover frame and serving as an additional means for securing the bracket thereto.

Slide blocks 27 are arranged upon the post 5 for vertical movement, each of said blocks having a dovetailed tongue 28 for engagement in the guide ways 7 of the respective posts. The block 27 is further provided with a sleeve 29 which is adapted for loose rotatable engagement upon the pivot stud 23, said block at the inner end of the sleeve being formed with the opening 30 to accommodate a washer plate 31 and a key 32 on the end of the stud 23, whereby said stud is retained in connection with the slide block.

A mast or standard 33 is erected adjacent to each pair of corner posts 5, said standard being preferably of hollow steel construction and provided upon its upper end with a cap 34, secured in place by the set screw 35. This cap is formed with angularly disposed tubular arms or sockets 36 to receive the upper ends of the brace rods 37, the lower ends of said rods being mounted in the sockets 9 formed upon the caps 8 of the corner posts. These brace rods are securely held in connection with the caps 8 and 24 by means of suitable set screws indicated at 38 and 39 respectively. In the upper end of each cap 34, a sheave or pulley 40 is mounted and over the same, a cable 41 is trained. One end of this cable is fixed to the perforated ear 19 secured upon the frame of one of the cover sections. Cables 42 are also engaged over the sheaves 43 mounted in the blocks 12 and are fixed at one of their ends to the respective slide blocks 27.

Upon the lower end of each of the standards 33, a substantially U shaped casting 44 is secured, said casting being arranged upon one side of the standard and bolted to a clamping member 45 engaged upon the opposite side thereof. This clamping member is formed with oppositely extending arms 46 and the U shaped casting is provided upon its ends with similar arms 47. In the arms 46 and 47 upon each side of the standard, a drum shaft 48 is journaled. Upon each of said shafts at one side of its center, a sleeve 49 is keyed, bolted or otherwise rigidly secured, said sleeve being formed with the spaced peripheral flanges 50. On one end of said sleeve, a flange 51 is formed, said flange being provided in its edge with a notch or recess 52. A bolt 53 is slidably mounted in alined openings in the flanges 50 and is provided adjacent one end with a lug 54. A stop collar 55 is threaded upon said bolt, and a coil spring 56 bears at one of its ends against this collar and at its other end against one of the flanges 50. Upon one of the shafts 48 a single drum 57 is loosely mounted while upon the other of said shafts, a double drum 58 is similarly arranged, said latter drum being adapted to receive the cables 42. Each of these drums is provided upon one end with a circular head 59 having an opening 60 therein. Upon the other end of each drum, a ratchet wheel 61 is secured. The teeth of these ratchets extend in relatively opposite directions and are adapted for engagement by the pawls or dogs 62 which are pivotally mounted at one of their ends upon the clamping member 45. To the end of each shaft 48, a gear wheel 63 is fixed and upon the clamping member 45, pinions 64 are mounted for engagement with the respective gear wheels, said pinions also meshing with each other. One of these pinions is equipped with a suitable crank handle 65, and it will be obvious that when the same is rotated, the gear 63 will be turned in relatively opposite directions.

The drum 57 is provided upon the inner side of the head 59 with spaced flanges 66, each of which is formed with an opening 67 to receive the cable 41. Between these flanges, a bolt 68 is arranged, the threaded shank of which projects outwardly from the flanges. This shank has an eye 69 formed upon one end, said eye being disposed between the flanges 66. The edges of the eye opening are threaded or roughened as shown at 71 so as to obviate liability of the cable slipping therethrough. The shank of the bolt 68 is equipped with a washer 72 and a nut 73 is threaded upon said bolt. It will be obvious from this description that when the cable has been connected to the eye of the bolt, the adjustment of the nut 73 forces the washer 72 in engagement with the edges of the flanges 66 and the eye of the bolt is drawn outwardly between said flanges so as to tightly clamp the same and the cable against said flanges. One of these cable clamping devices, identical with that above described is also arranged upon each side of the central head of the double drum 58, for the connection of the cables 42 thereto.

Upon each of the standards 33, a split resilient ring 74 is engaged, the ends of said ring being clamped together upon the standard by the bolt 75. To each of said clamping rings, a pair of rods 76 are loosely connected, and upon said rods the sheave blocks or yokes 77 are swiveled. Sheaves 78 are mounted in these blocks, said sheaves providing guides for the cables 42.

In the operation of the apparatus above described, it will be understood that when the drums of the winch mechanism are rotated by means of the cranks 65, the cables 41 and 42 are wound upon the respective drums and the cover sections 17 simultaneously drawn upwardly between the corner posts 5, the blocks 27 sliding freely in the guide ways 7. In order to thus wind the cables upon the drums, it is of course understood that the drums are locked upon their respective shafts by means of the spring pressed bolts 53, the lugs of said bolts being disposed in the notches 52 of the flanges 51 and the extremities of the bolts extending through the openings 60 in the drum heads. After the stack cover has been elevated, the double drum 58 is released from locked engagement with the fixed sleeve 49 on the shaft 48 by throwing the pawl 62 engaged with the ratchet on the end of the drum to its inoperative position. By now turning the crank 65, only the drum 57 will be rotated to wind the cable 41 thereon, thereby swinging the cover section to which said cable is connected upwardly to the inclined position shown in dotted lines in Fig. 1, said cover section rotating at one of its ends upon the slide blocks 27. In order to prevent said cover section from being moved past its center of gravity, I provide a metal pipe or tube 79 upon the cable 41, said pipe being located between the upper end of the standard 33 and the end of the cover section to which the cable is attached. It will be obvious that by providing this pipe or tube, the pivotal movement of the cover section upwardly from its horizontal position is limited, the extent of such movement being determined by the length of the tube, one end of which will engage with the cap 34 on the upper end of the standard and the other end with the cover section. Thus when the bolt 53 is retracted, to release the drum 57 from connection with the drum shaft and the pawl 62 thrown to its ineffective position the cover section will move downwardly by gravity to its normal horizontal position. When the locking bolts 53 are retracted to release the cable drums, the same are turned so as to position the lugs 54 thereon at right angles to the recesses 52 in the flanges 51, said bolts being thus held in their retracted positions against the action of the coil springs 56.

The post 5 and the standard 33 are braced by means of the wires 80 and 81 respectively, the upper ends of which are secured to the caps on said posts and standards and the lower ends thereof suitably anchored to the ground.

From the foregoing description taken in connection with the accompanying drawings, it is believed that the construction, manner of operation and several advantages of my invention will be clearly and fully understood. The apparatus provides means whereby the stack cover may be easily and quickly adjusted and arranged over the hay stack, with comparatively little manual labor. By raising the stack cover sections upon the slide blocks to their inclined positions as shown in dotted lines in Fig. 1, free access is given to the upper portion of the hay stack so that the same may be loaded upon a hay rack or otherwise handled with facility. The several parts of the apparatus can also be easily and quickly set up in position for operation or readily dismantled and moved from place to place. The invention as a whole is comparatively simple in its construction, strong and durable in practical use and of great convenience and serviceability.

While I have shown and described the preferred construction and arrangement of the several elements, it will be understood that my invention is susceptible of considerable modification therein and I therefore reserve the privilege of resorting to all such legitimate changes as may be fairly embodied within the spirit and scope of the invention as claimed.

Having thus described the invention, what is claimed is:

1. In an apparatus of the character described, a cover mounted at one of its ends for pivotal and vertical sliding movement, cables connected to the pivoted end of the cover, a drum upon which said cables are adapted to be wound, a cable connected to the free end of the cover and normally supporting said cover in a horizontal position, a second drum for said latter cable, and means for independently operating said drums to move the cover vertically or swing the same from its horizontal position to an inclined position.

2. In an apparatus of the character described, spaced vertical guides, slide blocks mounted in said guides, a cover pivotally mounted at one of its ends upon said slide blocks, means connected to the other end of said cover to swing the same from a horizontal position to an upwardly inclined position with respect to said guides, and additional means connected to the slide blocks to move the same vertically in the guides and adjust the position of said cover thereon.

3. In an apparatus of the character described, spaced vertical guides, slide blocks mounted in said guides, a cover pivotally mounted at one of its ends upon said slide blocks, cables connected to said slide blocks, a drum upon which said cables are adapted to be wound, a cable connected to the free end of the cover and normally supporting said cover in a horizontal position, a second drum for said latter cable, and means for independently operating said drums to adjust the cover upon said vertical guides or swing the same upwardly to an inclined position with respect thereto.

In testimony whereof I hereunto affix my signature in the presence of two witnesses:

WILBER BRADEN SPALDING.

Witnesses:
   JOHN W. WILSON,
   S. N. FAIRFIELD.

---

Copies of this patent may be obtained for five cents each, by addressing the "Commissioner of Patents, Washington, D. C."